Oct. 20, 1970  R. J. KEOGH  3,534,469
METHOD OF MANUFACTURING WINDINGS FOR DISC-TYPE
DC MACHINE ARMATURES
Original Filed March 3, 1967  4 Sheets-Sheet 1

INVENTOR.
RAYMOND J. KEOGH

ATTORNEYS

INVENTOR.
RAYMOND J. KEOGH

ATTORNEYS

Oct. 20, 1970   R. J. KEOGH   3,534,469
METHOD OF MANUFACTURING WINDINGS FOR DISC-TYPE
DC MACHINE ARMATURES
Original Filed March 3, 1967   4 Sheets-Sheet 3

INVENTOR.
RAYMOND J. KEOGH

ATTORNEYS

United States Patent Office 3,534,469
Patented Oct. 20, 1970

3,534,469
METHOD OF MANUFACTURING WINDINGS FOR DISC-TYPE DC MACHINE ARMATURES
Raymond J. Keogh, Huntington, N.Y., assignor to Photocircuits Corporation, Glen Cove, N.Y., a corporation of New York
Original application Mar. 3, 1967, Ser. No. 620,306. Divided and this application Oct. 3, 1968, Ser. No. 798,497
Int. Cl. H02k 15/00
U.S. Cl. 29—598                14 Claims

ABSTRACT OF THE DISCLOSURE

A wire wound motor armature constructed by forming successive groups of single turn armature coils, the coils within each group being in registry with one another, the groups being indexed relative to one another, and all coils being interconnected in a wave configuration.

The apparatus for forming the winding including a rotating winding form and a wire dispensing stylus moving radially, the movements of the form and the stylus being coordinated to form the winding.

---

This application is a division of co-pending application Ser. No. 620,306 filed Mar. 3, 1967 in the name of Raymond J. Keogh.

BACKGROUND OF INVENTION

In the construction of electric motor armatures it has been generally accepted that the coil span of the individual armature coils must be either slightly greater, or slightly less than the distance between adjacent magnetic pole centers. If the coil span is slightly less, a retrogressive winding results, whereas, if the coil span is slightly greater, a progressive winding results. By having the coil span slightly different from the distance between magnetic pole centers there is a slight indexing of the winding with each successive armature coil and, as a result, the coils each have the same configuration and are uniformly distributed over the armature surface in a symmetrical fashion.

In conventional DC machines the armature is usually formed with multiturn, preformed coils which are placed in coil slots of a laminated iron core. Since the winding must conform to the armature slot locations, it is desirable to have a uniform indexing of the winding with respect to each successive coil such that all coils have the same shape and all slots contain the same number of conductors.

In recent years the low inertia, printed circuit type of motor has been developed eliminating the iron and coil slots in the armature. The printed circuit motor usually includes a disc shaped armature in which radially extending array of conductors are usually bonded to opposite sides of an insulating carrier. The conductor patterns for the armature are formed either by chemical techniques, i.e. plating, or etching, or by mechanical stamping techniques. The restrictions upon the winding configurations in a printed circuit motor are even more severe than in the case of a conventional motor. For example, a two layer printed circuit armature must be formed with single turn coils, the winding must be retrogressive and each coil must index the winding so that all coils have the same configuration.

The printed circuit motor has the advantages of high acceleration and smooth torque, but, because of the single turn coils, can only operate at relatively low voltages.

In a co-pending application, Ser. No. 511,608 filed Dec. 6, 1965, in the name of Robert Page Burr, having a common assignee with this application, an insulated wire wound type of motor is illustrated as well as the methods for making the same. This armature can be formed by depositing insulated wire around positioning pins by means of a wire dispensing stylus. Each successive coil, which can be single or multiturn, indexes the winding slightly to obtain a uniformly progressive or retrogressive winding distributed around the positioning pins. This type of armature if constructed with multiturn armature coils can operate at higher voltages but is difficult to construct with automatic machinery because it is necessary to constantly reverse the winding direction while forming the multiturn coils.

BRIEF DESCRIPTION OF THE INVENTION

This invention relates to an improved winding technique for wire wound armatures which do not include slots for the armature coils as well as the apparatus for making the winding.

The armature is formed by depositing insulated wire, preferably around positioning pins, following a pattern forming a plurality of single turn coils which are all in registry and thus, if the pattern is continued, successive armature loops would occupy approximately the same positions. Instead of indexing the winding with the formation of each successive armature coil, the winding is indexed only after a predetermined number of coils have been formed in registry with one another.

BRIEF DESCRIPTION OF THE DRAWINGS

An illustrative embodiment of the invention is set forth in the drawings which form part of the specification and wherein.

ARMATURE CONSTRUCTION GENERALLY

Figure 1:
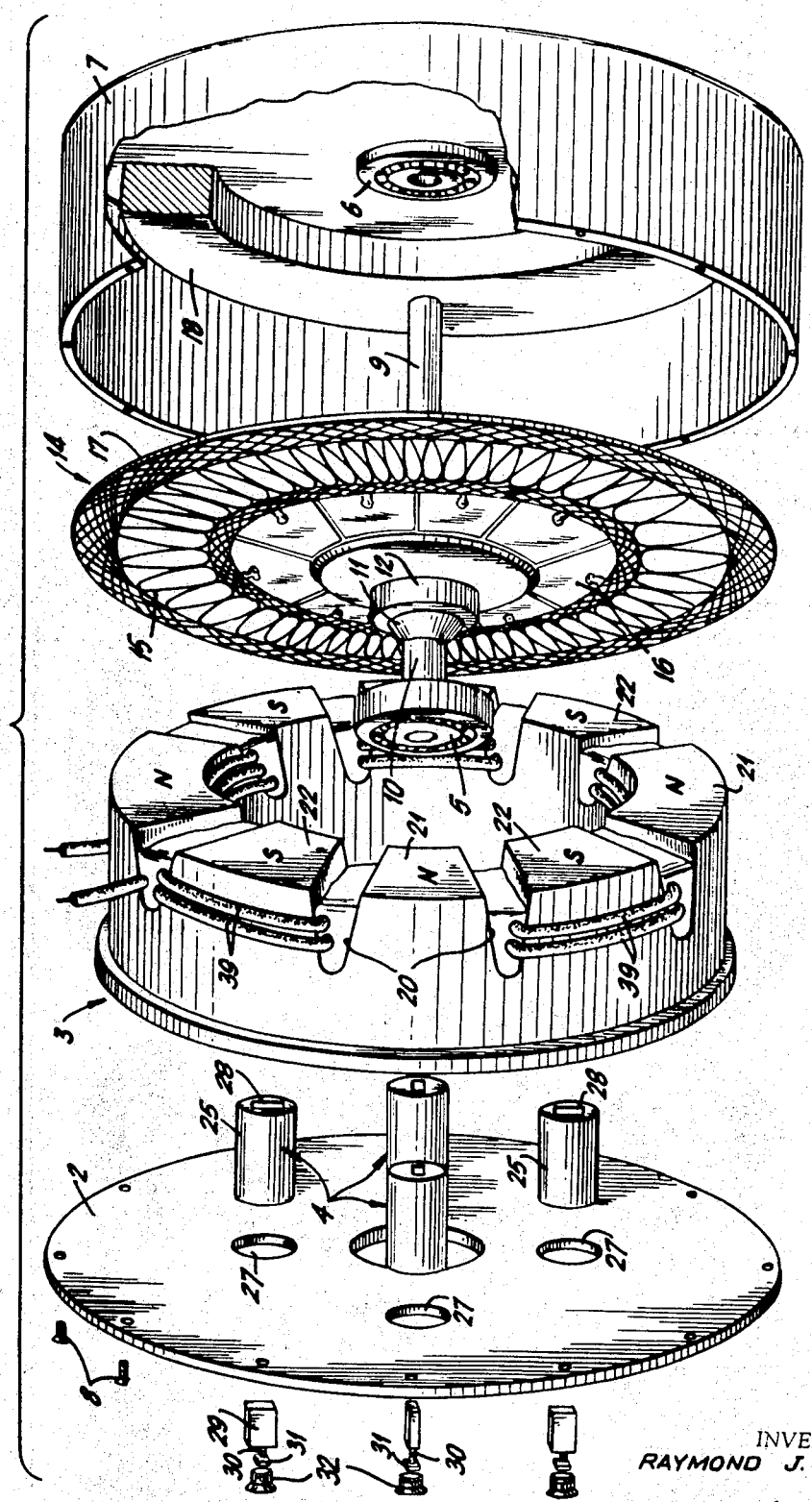
FIG. 1 is a perspective assembly drawing of the motor.

The rotating winding for disc type machine includes a large number of radially extending insulated wire segments distributed to form an annular array which will be adjacent the stationary magnetic pole faces in the completed machine. These radially extending segments are interconnected to form a continuous winding which is substantially planar, or in other words, is in the form of a relatively thin disc. Successive radially extending segments of the winding are displaced by a distance approximately equal to the distance between pole centers of the associated magnetic structure and are interconnected so that current flowing in the winding will flow in one direction across the south poles and in the opposite direction across the north poles.

The radially extending segments are preferably arranged to minimize the crossing of conductors to thereby minimize the thickness of the armature disc within the magnetic air gap. The thinnest possible winding configuration would occur where all radially extending segments are substantially radial. However, when automatic winding techniques are employed, it is often preferable to have the radially extending segments somewhat skewed.

The portions of the winding which interconnect the radially extending segments and which lie outside the annular air gap area have a thickness at least twice the diameter of the conductors. As the crossover areas of the armature winding are decreased in width, for example, to reduce the diameter of the armature, additional stacking of the conductors occurs and hence the thickness of the armature winding in these areas increases. However, the crossover connections, by definition, are not within the working air gap of the machine and, therefore, this increased thickness is not detrimental to the performance of the machine.

The winding is formed in a continuous fashion utilizing insulated wire and, since the conductors are insulated, it is possible to cross conductors as desired. The copper distribution can be controlled to achieve a low copper density in the area of the air gap and a higher copper density in the thicker crossover areas outside the air gap. This control over the relative copper density permits the designer to optimize performance for a particular size armature disc.

An armature turn is the portion of the winding including two successive radially extending segments. When the armature is constructed in accordance wtih this invention the armature coils are each single turn coils, and, therefore, each armature coil likewise includes two successive radially extending segments. An armature loop is a portion of the winding which spans approximately 360 degrees of the armature. Thus, with an eight pole machine an armature loop includes four successive armature coils whereas with a 12 pole machine an armature loop includes six successive armature coils.

If the armature coils comprising a loop are in registry, the armature loop spans exactly 360 degrees and if successive armature loops are in registry with the first, the successive armature loops occupy essentially the same positions. For the purposes of this invention, armature coils are defined as being in registry where they are part of an armature loop which, if completed, would be in registry with the prior armature loop or portions thereof. Indexing of the winding occurs when successive armature loops or portions thereof lie in positions adjacent prior armature loops.

FIGS. 3A-3D illustrate the step by step formation of an armature winding for an eight pole machine including 117 armature coils and nine commutator segments. The winding is formed about a jig or die including inner and outer rows of positioning pins, each such row including 27 pins. The inner pins are designated 1a-27a and the outer pins are likewise designated 1b-27b. The tabs for connection to the commutator segments are designated A-L in the order of connection.

Since the armature is for an eight pole machine, each armature loop includes four armature coils. Since there are 27 positioning pins each armature coil spans approximately eight positioning pins. Since there are 117 coils and nine commutator segments, every thirteenth coil is connected to the commutator.

The armature winding commences by attaching the insulated wire to one of the commutator connection tabs designated as tab A. Tab A is in radial alignment with the first set of positioning pins 1a and 1b. The winding then passes outside positioning pins 2a, 3b, 4b and 5b in succession. The first armature coil is then completed by passing the wide inside pin 7a.

Next, the second armature coil is formed by passing the wire inside pin 8a, outside pins 10b–12b, and inside pin 14a. The winding continues by then forming the third and fourth armature coils by passing inside pin 15a, outside pins 17b–19b, inside pins 21a and 22a, outside pins 24b–26b and inside pin 1a. At this point the first armature loop spanning 360 degrees is completed as is illustrated in FIG. 3A.

Figures 2, 3A, 3B:
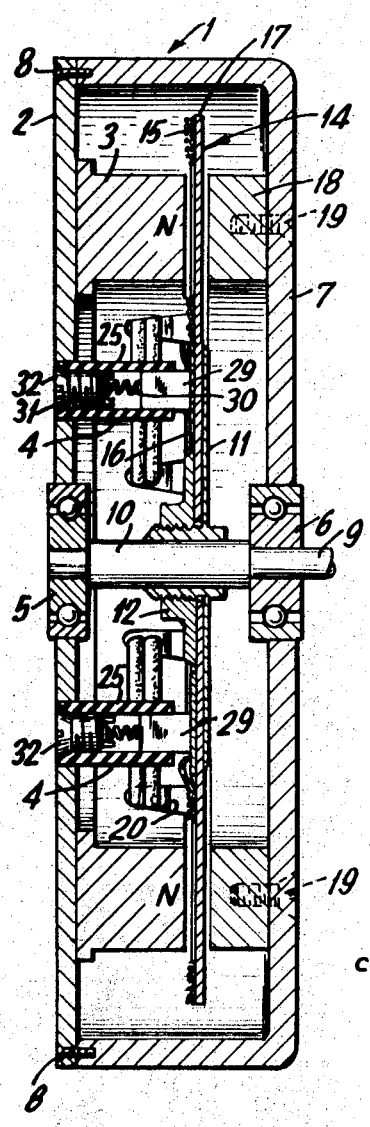
FIG. 2 is a cross sectional view of the assembled motor.
FIGS. 3A–3D are a series of diagrams illustrating the armature winding sequence.
Figure 3C:
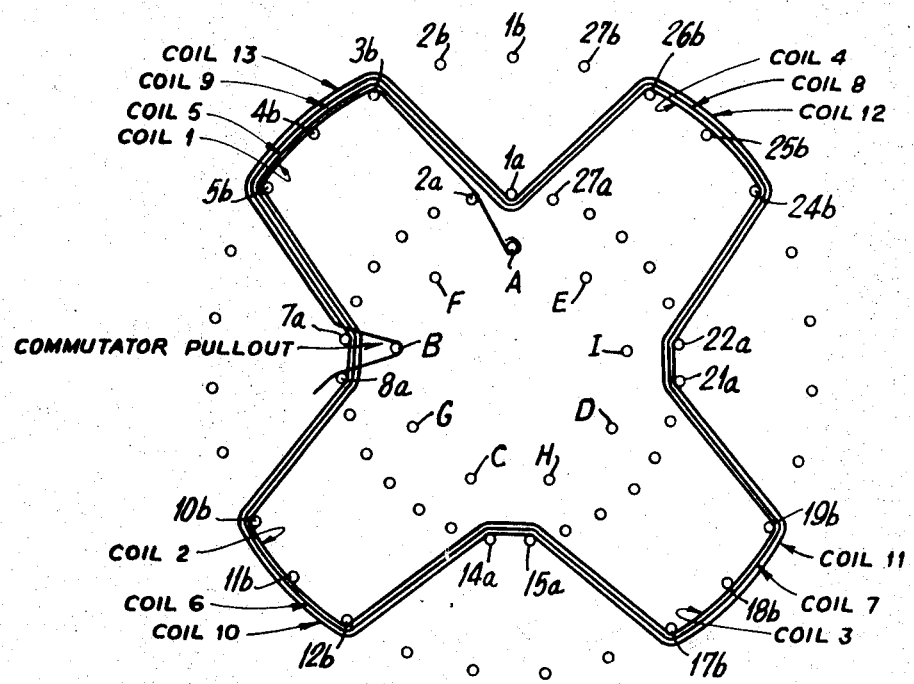

The second armature loop is in registry with the first armature loop and is formed following the same sequence around the positioning pins as shown in FIG. 3B. The third armature loop is also in registry as well as the first coil of the fourth armature loop. The winding as it appears after formation of three and one-quarter armature loops (13 coils) is shown in FIG. 3C. Each of the 13 coils in the first group are in registry with one another and follow the same pattern about the positioning pins.

A commutator pull out is formed following the first group of 13 coils by passing the winding around tab B. At this point the winding is also indexed so that the second group of thirteen coils will lie in positions adjacent the first group.

Figure 3D:
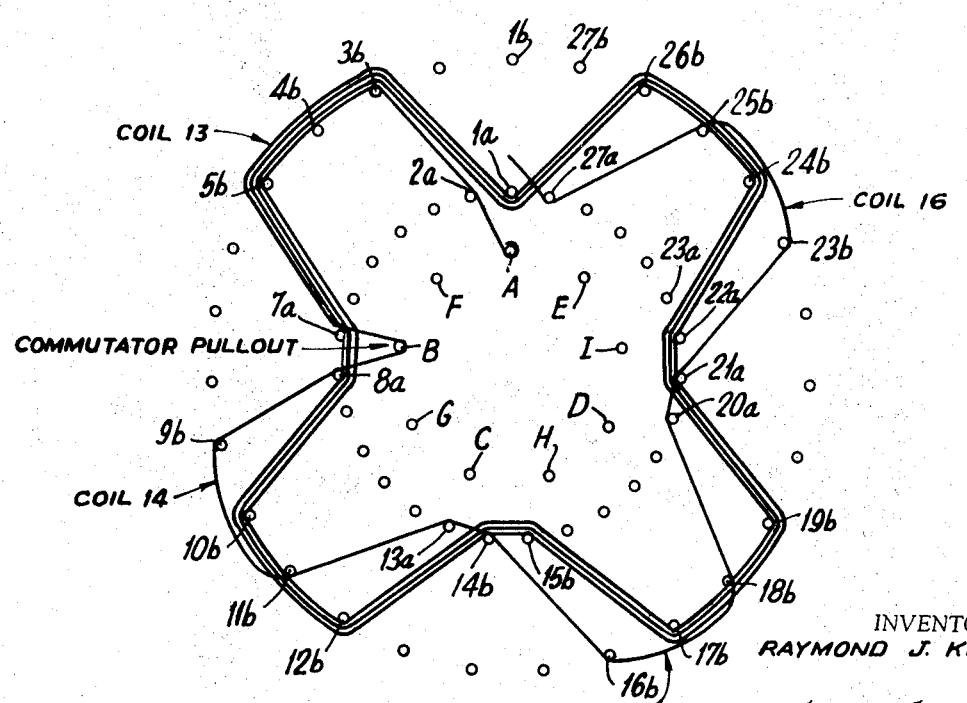

The winding progresses by passing outside pin 8a, outside pins 9b–11b, inside pins 13a and 14a, outside pins 16b–18b, inside pins 20a and 21a, outside pins 23b–25b and iiside pin 27a. The winding as it then appears after completion of four armature loops (16 coils), including three coils of the second group, is shown in FIG. 3D. Coils 14–16 of the second group are indexed relative to coils 1–13 of the first group.

The winding sequence for the entire 117 coil armature is set fourth in Table I.

TABLE I

| Coil | Start of coil | Outer pins | End of coil | |
|---|---|---|---|---|
| 1 | 4, 2 | 3–5 | 7 | Loop 1. |
| 2 | 8 | 10–12 | 14 | |
| 3 | 15 | 17–19 | 21 | |
| 4 | 22 | 24–26 | 1 | |
| 5 | 1 | 3–5 | 7 | Loop 2. |
| 6 | 8 | 10–12 | 14 | |
| 7 | 15 | 17–19 | 21 | |
| 8 | 22 | 24–26 | 1 | |
| 9 | 1 | 3–5 | 7 | Loop 3. |
| 10 | 8 | 10–12 | 14 | |
| 11 | 15 | 17–19 | 21 | |
| 12 | 22 | 24–26 | 1 | |
| 13 | 1 | 3–5 | 6, B | |

First Pullout—first index point

| | | | | Loop 4. |
|---|---|---|---|---|
| 14 | B, 8 | 9–11 | 13 | |
| 15 | 14 | 16–18 | 20 | |
| 16 | 21 | 23–25 | 27 | |
| 17 | 1 | 3–5 | 7 | Loop 5. |
| 18 | 7 | 9–11 | 13 | |
| 19 | 14 | 16–18 | 20 | |
| 20 | 21 | 23–25 | 27 | |
| 21 | 1 | 3–5 | 7 | Loop 6. |
| 22 | 7 | 9–11 | 13 | |
| 23 | 14 | 16–18 | 20 | |
| 24 | 21 | 23–25 | 27 | |
| 25 | 1 | 3–5 | 7 | |
| 26 | 7 | 9–11 | 12, C | |

Second Pullout—second index point

| | | | | Loop 7. |
|---|---|---|---|---|
| 27 | C, 14 | 15–17 | 19 | |
| 28 | 20 | 22–24 | 26 | |
| 29 | 27 | 2–4 | 6 | Loop 8. |
| 30 | 7 | 9–11 | 13 | |
| 31 | 13 | 15–17 | 19 | |
| 32 | 20 | 22–24 | 26 | |
| 33 | 27 | 2–4 | 6 | Loop 9. |
| 34 | 7 | 9–11 | 13 | |
| 35 | 13 | 15–17 | 19 | |
| 36 | 20 | 22–24 | 26 | |
| 37 | 27 | 2–4 | 6 | Loop 10. |
| 38 | 7 | 9–11 | 13 | |
| 39 | 13 | 15–17 | 18, D | |

Third Pullout—third index point

| | | | | Loop 11. |
|---|---|---|---|---|
| 40 | D, 20 | 21–23 | 25 | |
| 41 | 26 | 1–3 | 5 | |
| 42 | 6 | 8–10 | 12 | |
| 43 | 13 | 15–17 | 19 | Loop 12. |
| 44 | 19 | 21–23 | 25 | |
| 45 | 26 | 1–3 | 5 | |
| 46 | 6 | 8–10 | 12 | |
| 47 | 13 | 15–17 | 19 | Loop 13. |
| 48 | 19 | 21–23 | 25 | |
| 49 | 26 | 1–3 | 5 | |
| 50 | 6 | 8–10 | 12 | |
| 51 | 13 | 15–17 | 19 | |
| 52 | 19 | 21–23 | 24, E | |

Fourth Pullout—fourth index point

| | | | | Loop 14. |
|---|---|---|---|---|
| 53 | E, 26 | 27–2 | 4 | |
| 54 | 5 | 7–9 | 11 | |
| 55 | 12 | 14–16 | 18 | |
| 56 | 19 | 21–23 | 25 | Loop 15. |
| 57 | 25 | 27–2 | 4 | |
| 58 | 5 | 7–9 | 11 | |
| 59 | 12 | 14–16 | 18 | |
| 60 | 19 | 21–23 | 25 | Loop 16. |
| 61 | 25 | 27–2 | 4 | |
| 62 | 5 | 7–9 | 11 | |
| 63 | 12 | 14–16 | 18 | |
| 64 | 19 | 21–23 | 25 | |
| 65 | 25 | 27–2 | 3, F | |

Fifth Pullout—fifth index point

| | | | | Loop 17. |
|---|---|---|---|---|
| 66 | F, 5 | 6–8 | 10 | |
| 67 | 11 | 13–15 | 17 | |
| 68 | 18 | 20–22 | 24 | |
| 69 | 25 | 27–2 | 4 | Loop 18. |
| 70 | 4 | 6–8 | 10 | |
| 71 | 11 | 13–15 | 17 | |
| 72 | 18 | 20–22 | 24 | |
| 73 | 25 | 27–2 | 4 | Loop 19. |
| 74 | 4 | 6–8 | 10 | |
| 75 | 11 | 13–15 | 17 | |
| 76 | 18 | 20–22 | 24 | |

TABLE I

| Coil | Start of coil | Outer pins | End of coil | |
|---|---|---|---|---|
| 77 | 25 | 27-2 | 4 | |
| 78 | 4 | 6-8 | 9, G | Loop 20. |

Sixth pullout—sixth index point

| Coil | Start of coil | Outer pins | End of coil | |
|---|---|---|---|---|
| 79 | G, 11 | 12-14 | 16 | |
| 80 | 17 | 19-21 | 23 | |
| 81 | 24 | 26-1 | 3 | |
| 82 | 4 | 6-8 | 10 | Loop 21. |
| 83 | 10 | 12-14 | 16 | |
| 84 | 17 | 19-21 | 23 | |
| 85 | 24 | 26-1 | 3 | |
| 86 | 4 | 6-8 | 10 | Loop 22. |
| 87 | 10 | 12-14 | 16 | |
| 88 | 17 | 19-21 | 23 | |
| 89 | 24 | 26-1 | 3 | |
| 90 | 4 | 6-8 | 10 | |
| 91 | 10 | 12-14 | 15, H | Loop 23. |

Seventh pullout—seventh index point

| Coil | Start of coil | Outer pins | End of coil | |
|---|---|---|---|---|
| 92 | H, 17 | 18-20 | 22 | |
| 93 | 23 | 25-27 | 2 | |
| 94 | 3 | 5-7 | 9 | Loop 24. |
| 95 | 10 | 12-14 | 16 | |
| 96 | 16 | 18-20 | 22 | |
| 97 | 23 | 25-27 | 2 | |
| 98 | +3 | 5-7 | 9 | Loop 25. |
| 99 | 10 | 12-14 | 16 | |
| 100 | 16 | 18-20 | 22 | |
| 101 | 23 | 25-27 | 2 | |
| 102 | 3 | 5-7 | 9 | Loop 26. |
| 103 | 10 | 12-14 | 16 | |
| 104 | 16 | 18-20 | 21, I | |

Eight pullout—eight index point

| Coil | Start of coil | Outer pins | End of coil | |
|---|---|---|---|---|
| 105 | I, 23 | 24-26 | 1 | |
| 106 | 2 | 4-6 | 8 | |
| 107 | 9 | 11-13 | 15 | Loop 27. |
| 108 | 16 | 18-20 | 22 | |
| 109 | 22 | 24-26 | 1 | |
| 110 | 2 | 4-6 | 8 | |
| 111 | 9 | 11-13 | 15 | Loop 28. |
| 112 | 16 | 18-20 | 22 | |
| 113 | 22 | 24-26 | 1 | |
| 114 | 2 | 4-6 | 8 | Loop 29. |
| 115 | 9 | 11-13 | 15* | |
| 116 | 16 | 18-20 | 22 | |
| 117 | 22 | 24-26 | 27, A | Closing coil. |

ARMATURE DESIGN CONSIDERATIONS

In designing an armature certain factors must be known at the outset. These factors are, for example:

(1) The outside diameter of the armature;
(2) The number of pole pairs in the magnetic structure;
(3) The flux level which will be produced by the magnetic structure;
(4) The desired voltage constant for the armature, that is, the voltage generated by the armature per 1000 r.p.m.;
(5) The winding resistance.

These factors are interrelated, and, particularly factors 3, 4 and 5 must be compatible if a reasonable armature is to result.

For the armature shown in FIGS. 3A–3D these factors are an outside armature diameter of 3.6 inches, four pole pairs (eight poles), a flux wheel of 5.3 kilogauss as can be obtained with Alnico permanent magnets, a voltage constant of 2.2 volts per 1000 r.p.m., and a winding resistance of two ohms end to end.

The number of armature conductors can be determined by the following formula:

$$k_e = \frac{pN\phi \times 10^{-8}}{2\pi} \quad (1)$$

wherein $k_e$ equals volts/rad/sec.; $p$ equals number of pole pairs, $\phi$ equals flux per pole in Maxwells, and N equals the number of conductor pairs or armature turns.

Substituting the aforementioned factors into Formula 1 provides the following:

$$k_e = \frac{4(2 \times 97)(18,000)10^{-8}}{6.28} \quad (2)$$

$$k_e = 0.022 \text{ volt/rad/sec.} \quad (3)$$

Thus, it is determined that approximately 97 conductor pairs (armature turns) provides 0.022 volt/rad/sec. which in turn is equal to approximately 2.2 volts per 1000 r.p.m.

Formula 1 assumes an armature coil shape which is carefully selected to conform to the shape of the magnets forming the stator poles. In the interest of simplicity and winding speed a simplified configuration has been adopted as shown in FIGS. 3A–3D which is approximately 80% efficient. Thus, to obtain the desired characteristics the number of armature turns is increased by a factor of 1.2, and hence, approximately 116 armature turns are required.

For simplicity the number of commutator segments should be a sub-mutiple of the number of armature turns. If dead coils are to be avoided, the number of commutator segments must be odd if the number of pole pairs is even and vice versa. Furthermore, the commutator connection points should occur at regularly spaced intervals throughout the armature spaced by a number of complete armature loops plus or minus one armature turn. Thus, the coil spacing between commutator connection points can be expressed:

$$Y = n(p) \pm 1 \quad (4)$$

wherein Y equals the number of armature turns between commutator connection points, $p$ equals the pairs of poles (also number of armature turns per armature loop), $n$ is an integer multiplier and the + or − sign is chosen to yield a progressive or retrogressive winding, as desired.

Tabe II indicates the number of conductors required in the armature for an eight pole machine having various combinations or of commutator segments and distances between commutator connection points in accordance with the relationship:

$$Y = n(p) + 1 \quad (5)$$

TABLE II

| No. of commutator segments | 1¼ loop/pullout (5 conductor pairs) | 2¼ loop/pullout (9 conductor pairs) | 3¼ loop/pullout (13 conductor pairs) | 4¼ loop/pullout (17 conductor pairs) | 5¼ loop/pullout (21 conductor pairs) | 6¼ loop/pullout (25 conductor pairs) |
|---|---|---|---|---|---|---|
| 3 | 15 | 27 | 39 | 51 | 62 | 75 |
| 5 | 25 | 45 | 65 | 85 | 105 | 125 |
| 7 | 35 | 63 | 91 | 119 | 147 | 175 |
| 9 | 45 | 81 | 117 | 153 | 189 | 225 |
| 11 | 55 | 99 | 143 | 187 | 231 | 275 |
| 13 | 65 | 117 | 169 | 221 | 273 | 325 |
| 15 | 75 | 135 | 195 | 255 | 315 | 375 |

From Table II it can be seen that an armature having thirteen commutator segments and commutator connection points spaced by 2¼ armature loops (9 armature turns or conductors pairs) would have a total of 117 armature turns; an armature with nine commutator segments and a spacing between commutator connection points of 3¼ loops (13 conductor pairs or armature turns) would also have a total of 117 armature turns; and an armature with seven commutator segments and a spacing between commutator connection points of 4¼ armature loops (17 conductor pairs or armature turns) would include a total of 119 armature turns. Any of these three combinations could be used for the armature under consideration wherein the desired number of armature turns is approximately 116.

A similar table could be developed for an eight pole machine with the spacing between commutator connection points according to the formula:

$$Y = n(p) - 1 \quad (6)$$

In this arrangement the commutator connection points would occur at ¾, 1¾, 2¾, etc., armature loops. From this additional table other combinations can be found which could be used in the design of an armature having approximately 116 armature coils.

For the armature shown in FIGS. 3A–3D the combination of nine commutator segments and commutator connection points separated by 3¼ armature loops (13 armature turns) has been selected which provides an armature with a total of 117 armature turns, this selection being sufficiently closed to the desired number of armature turns.

The criteria for the location of the indexing points is the same as that for the location of commutator connection points, and hence is represented by Formula 4. For convenience, the indexing points are normally selected to coincide with the commutator connection points since it is possible to make both the commutator connection and to index the winding as part of the same step in the winding sequence. However, the commutator connection points and the indexing points need not coincide nor need the coil spacing between commutator connection points be the same as that between successive indexing points.

The number of positioning pins used in forming the armature must be a multiple of both the number of commutator segments and the number of indexing points. In the armature under consideration, the number of commutator segments has been selected as nine and the number of indexing points is also nine. Accordingly, the armature can be constructed using a number of positioning pins which is a multiple of nine. A better winding distribution occurs as the number of positioning pins increases, but as the number of positioning pins increases, the complexity of the armature winding apparatus also increases. Furthermore, a practical limit is reached when the spacing between positioning pins of the inner row approaches ten pins per inch. For the winding under consideration a multiplier of three has been selected and hence there are 27 positioning pins.

The wire size is determined by measuring the approximate length of an armature turn, multipling this length by the number of turns in the armature to obtain the total armature length, and by then consulting a wire table to select a wire size which provides the desired armature resistance. From a standard copper wire table number 28 gauge wire is found satisfactory for the armature under consideration having a resistance of two ohms end to end.

In many cases it is desirable to construct the armature using multistrand insulated wire as this tends to provide a thinner more evenly distributed winding. Such an armature can be formed by dispensing multistrand wire as the armature is formed. The same armature can also be made by repeating the entire winding sequence several times with a single strand of wire. A pair of 31 gauge copper wires would provide essentially the same electrical characteristics for the winding under consideration.

The winding technique in accordance with the invention is quite flexible and is highly desirable since a large number of different armatures can be made utilizing the same automatic winding apparatus and can often be made using the same winding forms, i.e. winding forms with the same number of positioning pins.

MOTOR ASSEMBLY

An insulated wire wound disc type motor in accordance with one embodiment of this invention is shown in FIGS. 1 and 2. The motor is enclosed within a two-part housing 1 including a base plate 2. A stationary permanent magnet structure 3, brush holders 4 and one of the bearings 5 are mounted on the base plate. The other bearing 6 is mounted within a central opening in the cup-shaped member 7 forming the other part of the motor housing, member 7 being secured to the base plate at its periphery by means of screws 8.

The motor shaft 9 is journaled in bearings 5 and 6, and includes an intermediate section 10 of increased diameter. The increased diameter section is positioned between the bearings and prevents axial movement of the shaft. The motor armature 14 is mounted on shaft 9 by means of a flanged hub 11 rigidly secured to the shaft and an associated flanged nut 12 which cooperates with the external threads on the shank portion of the hub. The dielectric disc 17 forming part of armature 14 is rigidly secured between the flanges of nut 12 and hub 11.

The armature winding constructed as described in relation to FIGS. 3A–3D is supported on a dielectric disc 17 shown adjacent the winding for illustration purposes. The commutator segments 16 are centrally located with respect to the winding and are secured to dielectric disc 17. The flange of hub 11 provides structural backing for the commutator to prevent distortion of the armature disc due to the force exerted against the commutator by the brushes.

The motor illustrated in FIGS. 1 and 2 is an eight pole motor and therefore the permanent magnet structure 3 is divided into eight segments which provide the necessary pole faces. The permanent magnet structure is a unitary ring-shaped member provided with slots 20 which define individual bosses that form an annular array of the pole faces lying in a plane perpendicular to the axis of rotation. The magnetic structure is a cast or sintered unit fashioned from a nickel-aluminum-cobalt alloy such as Alnico. The structure is magnetized to provide pole faces of alternating magnetic polarities. A ring 18 of soft iron is secured to the rear of the housing by screws 19 to complete the magnetic path between adjacent pole faces. The space between ring 18 and the pole face surfaces is the working air gap of the machine and must be sufficient to accommodate the armature and provide a working clearance.

A few turns of heavy, insulated wire, referred to as a charging winding, are placed around the individual pole pieces prior to final assembly. Charging winding 39 passes outside one pole piece 22, through a slot 20, and then inside the next pole piece 21, etc., twice around the unit. This winding in effect surrounds one pole piece in a clockwise direction, and surrounds the adjacent pole piece in the counterclockwise direction and, therefore, current flow through the charging winding tends to produce poles of alternating magnetic polarity. After final assembly the charging winding is energized to magnetize the permanent magnets.

The radially extending segments of the armature winding lie within the working air gap adjacent the pole faces. The thickness of this portion of the armature winding within the air gap is maintained at a minimum. The thicker portions of the winding which include the crossover connections are located outside the air gap.

Brush holders 4 each include an insulated sleeve having a cylindrical body portion 25, the end of which extends through suitable openings 27. The brushes 29 are rectangular in cross section and extend from the brush holders through suitably dimensioned rectangular openings 28. The end of the brush holder opposite the rectangular opening is internally threaded and adapted to receive a flat head screw 32. When the screw is inserted, pressure is applied to the brush via a spring 30 and small pressure plate 31, so that the brush is maintained in engagement with commutator segments 16. The number of brushes and the placement relative to the pole faces varies in accordance with the armature winding and current carrying requirements.

WINDING APPARATUS

Figure 4:
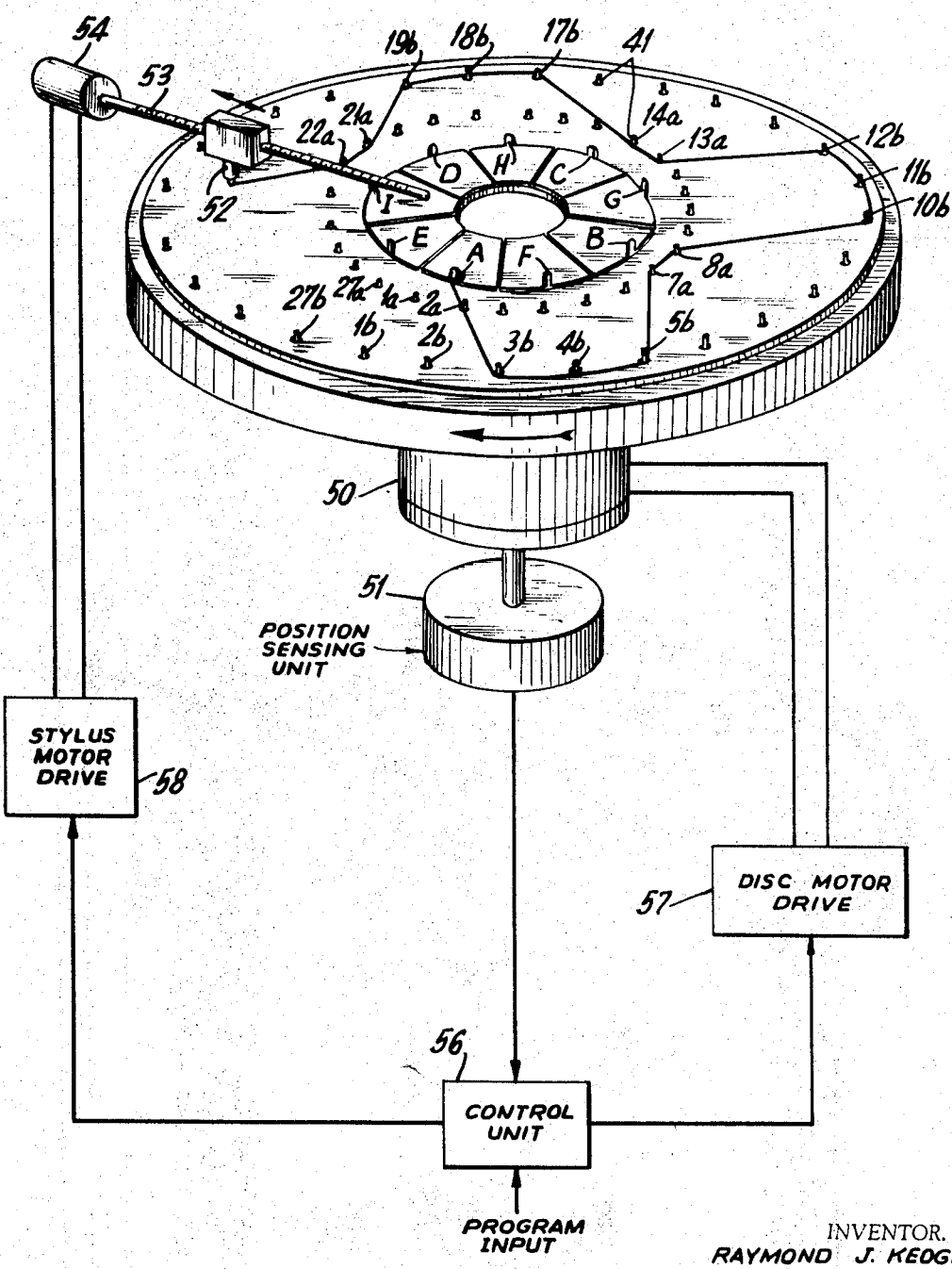
FIG. 4 is a schematic illustration of winding apparatus for forming the armature.

The armature can be constructed by distributing insulated wire upon a planar surface in continuous fashion. This is accomplished using a winding form 40 as shown in FIG. 4 having appropriately positioned pins 41 extending upwardly from the planar surface so that the insulated wires forming the armature can be wound around the pins. The pins are located in two concentric rows. The positioning pins in the inner row are designated 1a–27a, and the positioning pins in the outer row are designated 1b–27b, thereby corresponding to those shown in FIGS. 3A–3D.

The insulated wire can be distributed directly upon the planar surface of the winding form, or upon a disc blank 44 as shown. Holes are drilled or punched into the disc blank corresponding to the positions of the positioning pins and, hence, when the blank is dropped into position as shown in FIG. 4, the pins extend upwardly through the blank. The disc blank includes the commutator segments 45 secured to the disc surrounding a central opening which will accommodate the motor shaft and hub structure. Each commutator segment includes an upwardly extending tab, these tabs being used to position the commutator pullout loops of the winding.

Winding form 40 is coupled to a motor 50 which rotates the winding form in the clockwise direction. A position sensing unit 51 is coupled to the motor shaft and provides electrical signals indicating the instantaneous position of the winding form.

The insulated wire is dispersed by a stylus 52 mechanically coupled to a lead screw 53 which moves the stylus radially relative to the winding form. The movement of the stylus is controlled by a bidirectional, variable speed motor 54 coupled to the lead screw.

The operation of motors 50 and 54 is controlled from a control unit 56, respectively, via a disc motor drive 57 and a stylus motor drive 58. The control unit operates in accordance with a preselected program to coordinate the movements of the winding form and the stylus to form the desired winding configuration. The entire armature winding is formed while the winding form rotates in a single direction, and hence, since it is not necessary to periodically reverse the direction, relatively high winding speeds are readily attainable. As the winding form rotates, position sensing unit 51 provides signals indicating the position of the winding form, and these signals are compared with the program to control the corresponding radial movements of the stylus.

The winding forms and control programs are preferably interchangeable so that the same winding apparatus can form armatures of various sizes and various configurations.

After the insulated wire has been distributed to form the winding it is necessary to give it structural integrity so that the winding can be mounted on the motor shaft. There is no significant tendency for the magnetic field to deflect the armature winding in an axial direction and therefore the armature need only have sufficient rigidity to maintain clearance with respect to the stationary structure and to transmit torque between the winding and the motor shaft. Structural integrity is achieved by one of the following processes or combinations thereof:

(1) The winding is formed upon the surface of a thermoplastic disc blank as shown in FIG. 4, and when completed, heat and pressure are applied to press the winding into the disc blank. The winding, particularly in the annular air gap area, is embedded in the disc and has a thickness no greater than the insulated wire. The same result can be achieved by forming the winding without the disc blank and thereafter pressing the thermoplastic disc down upon the preformed winding.

(2) The winding can be laminated between a pair of thermoplastic discs. The winding is preformed and thereafter placed between the laminating discs, or can be wound upon one of the disc blanks as shown in FIG. 4. Preferably, the structure is compressed in the air gap area to manimize the thickness.

(3) The winding can be formed directly upon the winding form without a disc blank and thereafter coated, as by spraying, dipping or the like, with a suitable dielectric medium to provide structural integrity.

(4) The winding can be formed directly upon the winding form without a disc blank and thereafter spotted with an adhesive material to bond the insulated wires at points where the conductors cross.

(5) The winding can be formed with a heavy gauge wire which by itself posseses sufficient structural integrity.

SPECIFIC ARMATURE DESIGNS

There are a substantial number of possible armature designs within the scope of the invention. Several specific examples, in addition to that previously described, are as follows:

EXAMPLE NO. 1

The positions of the commutator pullouts need not coincide with the positions of the index points. A winding sequence for such an armature could be:

Start at a commutator connection;
Wind one full armature loop;
Index ahead two pins;
Wind 1¾ armature loops;
Form a commutator pullout;
Repeat.

The parameters and predicted operating characteristics for such an armature are as follow:

Number of poles—8
Number of commutator segments—27
Number of armature conductors—594
Number of armature turns—297
Number of positioning pins per row—81
Number of armature turns between indexing points—11
Number of armature turns between commutator pullouts—11
Type of winding—Progressive
Wire size—#30 A.W.G.
Outside diameter of armature—3.6 inches
Inside diameter of armature—2.0 inches
Armature resistance (including brushes)—1.9 ohms
Field flux—5 kilogauss
Voltage constant, $K_e$—5.5 v./k.p.m.
Torque constant $K_t$—7.4 in.-oz./amp
Dumping constant, $K_D$—0.18 in.-oz./k.p.m.

EXAMPLE NO. 2

The indexing points can be separated by less than a complete armature loop as indicated, for example, by Formula 6 when $n$ equals one. For a machine including four pole pairs the armature winding sequence would be:

start at a commutator connection;
wind ¾ of an armature loop;
index backward (retrogressive);
form a commutator pullout;
repeat.

The parameters and predicted operating characteristics for such an armature are as follows:

Number of poles—8
Number of commutator segments—35
Number of conductors—210
Number of turns—105
Number of pins in form (outer row)—105
Number of turns between indexing points—3
Number of turns between commutator segments—3
Type of winding—Retrogressive
Wire size—#24 A.W.G.
Outside diameter of armature—6.6 inches
Inside diameter of armature—3.5 inches
Armature resistance (excluding brushes)—0.3 ohm
Field flux—3.8 kilogauss
Voltage constant, $K_e$—5.5 v./k.p.m.
Torque constant $K_t$—7.4 in.-oz./amp
Damping constant, $K_D$—1.21 in.-oz./k.p.m.

EXAMPLE NO. 3

The number of positioning pins in the winding form can be odd or even. The winding sequence for an armature formed with an odd number of positioning pins having indexing points separated by an armature loop plus a fraction and having indexing points non-coincident with the commutator connection points could be:

start at a commutator connection;
wind one full armature loop;
index backward (retrogressive) one positioning pin;
wind ¼ armature loop;
form a commutator pullout;
repeat.

The parameters and predicted operating characteristics in such an armature are as follows:

Number of poles.—8
Number of commutator segments.—15
Number of conductors—150
Number of turns—75
Number of pins in form (outer row)—45
Number of turns between indexing points—10
Number of turns between commutator segments—10
Type of winding—Retrogressive
Wire size—Double strand(bifilar)—#28 A.W.G.
Outside diameter of armature—3.6 inches
Inside diameter of armature—2.0 inches
Armature resistance (excluding brushes)—0.25 ohm
Field flux—5.5 kilogauss
Voltage constant, $K_e$—1.4 v./k.p.m.
Torque constant, $K_t$—1.89 in.-oz./amp
Damping constant, $K_D$—0.176 in.-oz./k.p.m.

EXAMPLE NO. 4

An armature having characteristics almost identical to Example No. 3 can be formed using an even number of positioning pins. The winding sequence for such an armature being progressive and having coincident commutator pullouts and indexing points could be:

start at a commutator connection;
wind 1¾ armature loops;
form a commutator pullout;
repeat.

The parameters and predicted operating characteristics are as follows:

Number of poles—8
Number of commutator segments—11
Number of conductors—154
Number of turns—77
Number of pins in form (outer row)—44
Number of turns between indexing points—7
Number of turns between commutator segments—7
Type of winding—Progressive
Wire size—Double strand(bifilar)—#28 A.W.G.
Outside diameter of armature—3.6 inches
Inside diameter of armature—2.0 inches
Armature resistance (excluding brushes)—0.255 ohm
Field flux—5.5 kilogauss
Voltage constant, $K_e$—1.44 v./k.p.m.
Torque constant, $k_t$—1.94 in.-oz./amp
Damping constant, $K_D$—0.181 in.-oz./k.p.m.

EXAMPLE NO. 5

The indexing points can be separated by more than a plurality of armature loops. The winding sequence for an armature having indexing points separated by 3¼ armature loops could be:

start at a commutator connection;
wind 3¼ armature loops;
form a commutator pullout;
index backward one positioning pin;
repeat.

The parameters and predicted operating characteristics for such an armature are as follows:
Number of poles—8
Number of commutator segments—17
Number of conductors—442
Number of turns—221
Number of pins in form (outer row)—68
Number of turns between indexing points—13
Number of turns between commutator—segments—13
Type of winding—Retrogressive
Wire size double strand (bifilar)—#28 A.W.G.
Outside diameter of armature—3.6 inches
Inside diameter of armature—2.0 inches
Armature resistance (excluding brushes)—0.74 ohm
Field flux—5.5 kilogauss
Voltage constant, $K_e$—4.14 v./k.p.m.
Torque constant, $K_t$—5.60 in.-oz./amp
Damping constant, $K_D$—0.52 in.-oz./k.p.m.

EXAMPLE NO. 6

The distance between commutator connection points can be different from the distance between indexing points. A winding sequence for such an armature could be:

start at a commutator connection;
wind 2¼ armature loops;
index ahead one positioning pin;
wind one armature loop;
form commutator pullout;
winding 1¼ armature loops (total of 4½ loops from beginning;
index ahead one positioning pin;
wind two armature loops;
form commutator pullout;
continue sequence, indexing after every 2¼ armature loops, and forming a commutator pullout after every 3¼ armature loops.

The parameters and predicted operating characteristics for such an armature are as follows:

Number of poles—8
Number of commutator segments—9
Number of armature conductors—234
Number of armature turns—117
Number of positioning pins per row—27
Number of armature turns between indexing points—9
Number of armature turns between commutator connection points—13
Type of winding—Retrogressive
Wire size—28 A.W.G.
Outside diameter of armature—3.6 inches
Inside diameter of armature—2 inches
Armature resistance (including brushes)—0.5 ohms
Field flux—5.3 kilogauss
Voltage constant $K_e$—2.2 v./k.p.m.
Torque constant $K_t$—2.9 in.-oz./amp
Dumping constant $K_D$—1 in./k.p.m.

While several specific embodiments have been described in detail it should be obvious that there are numerous other embodiments within the scope of the invention. The invention is applicable to cylindrical armature as well as disc shaped armatures, and is more particularly defined in the appended claims.

What is claimed is:
1. A method of constructing an armature for an electrical machine having a multipole magnetic structure, including the steps of
distributing insulated wire on to a substantially planar surface and in a continuous fashion by means of a wire dispensing device automatically controlled to follow a predetermined path relative to the surface to form successive groups of single turn armature coils,
all coils within a group being in registry with one another,
each coil including a pair of winding segments spaced approximately in accordance with the distance between adjacent pole centers of the associated magnetic structure, and said coils being interconnected in a wave configuration;

indexing after formation of each group of coils so that one group of coils lies in coil positions adjacent those of a prior group of coils; and continuing the winding until the end of a group of coils substantially coincides with the starting point for the winding.

2. The method according to claim 1 wherein each group includes the same number of coils.

3. The method according to claim 1 wherein said indexing is progressive.

4. The method according to claim 1 wherein said indexing is retrogressive.

5. The method according to claim 1 wherein said winding is formed by distributing the insulated wire upon a disc form, and wherein the completed armature winding is embedded in said disc form.

6. The method according to claim 1 wherein said winding is formed by distributing multistrand insulated wire.

7. A method of constructing an armature for an electrical machine having a multipole magnetic structure, including the steps of distributing insulated wire on to a substantially planar surface and in a continuous fashion by means of a wire dispensing device automatically controlled to follow a predetermined path relative to the surface to form successive groups of single turn armature coils, each of said groups including the same number of coils, said number of coils being in accordance with the relation $$n(p) \pm 1$$

wherein $n$ is an integer and $p$ is the number of pole pairs in the magnetic structure, all coils within a group being in registry with one another, and each coil including a pair of winding segments spaced approximately in accordance with the distance between adjacent pole centers of the associated magnetic structure, indexing after formation of each group of coils so that one group of coils lies in coil positions adjacent those of a prior group of coils; and continuing the winding until the end of a group of coils substantially coincides with the starting point for the winding.

8. The method according to claim 7 wherein connections are made to commutator segments at regularly spaced intervals throughout said winding.

9. The method according to claim 8 wherein said connections are made while indexing between successive groups of coils.

10. A method of constructing an armature for an electrical machine having a multipole magnetic structure, including the steps of distributing insulated wire on to a substantially planar surface and in a continuous fashion by means of a wire dispensing device automatically controlled to follow a predetermined path relative to the surface to form successive groups of single turn armature coils, all coils within a group being in registry with one another, each coil including a pair of winding segments spaced approximately in accordance with the distance between adjacent pole centers of the associated magnetic structure, and said coils being interconnected in a wave configuration;

indexing after formation of each group of coils so that one group of coils lies in coil positions adjacent those of a prior group of coils; and forming commutator connection points at regularly spaced intervals throughout the winding, the number of coils between commutator connection points being $$n(p) \pm 1$$

where $n$ is an integer and $p$ is the number of pole pairs in the magnetic structure; and continuing the winding until the end of a group of coils substantially coincides with the starting point for the winding.

11. The method according to claim 10 wherein each of said groups includes the same number of coils, said number of coils being in accordance with the relation $$n'(p) \pm 1$$

wherein $n'$ is an integer and $p$ is the number of pole pairs in the magnetic structure.

12. The method according to claim 11 wherein the distance between successive indexing points is the same as the distance between successive commutator connection points.

13. The method according to claim 11 wherein said indexing points coincide with said commutator connection points.

14. The method according to claim 10 wherein said winding is continued beyond said starting point and the end of said winding is connected to the beginning after passing said starting point a plurality of times, said winding being connected at each of said commutator connection points at least two times.

References Cited

UNITED STATES PATENTS

| 295,534 | 3/1884 | Frick | 310—268 |
| 459,610 | 9/1891 | Desroziers | 310—268 |
| 514,907 | 2/1894 | Brush | 310—268 |

JOHN F. CAMPBELL, Primary Examiner

C. E. HALL, Assistant Examiner

U.S. Cl. X.R.

29—605; 140—92.1; 310—268